(12) United States Patent
Marshall

(10) Patent No.: US 9,772,446 B2
(45) Date of Patent: Sep. 26, 2017

(54) DISPLAYS

(71) Applicant: BAE SYSTEMS plc, London (GB)

(72) Inventor: Ian Marshall, Rochester (GB)

(73) Assignee: BAE SYSTEMS plc, London (GB)

(*) Notice: Subject to any disclaimer, the term of this patent is extended or adjusted under 35 U.S.C. 154(b) by 0 days.

(21) Appl. No.: 15/125,750

(22) PCT Filed: Mar. 12, 2015

(86) PCT No.: PCT/GB2015/050720
§ 371 (c)(1),
(2) Date: Sep. 13, 2016

(87) PCT Pub. No.: WO2015/136288
PCT Pub. Date: Sep. 17, 2015

(65) Prior Publication Data
US 2017/0003447 A1 Jan. 5, 2017

(30) Foreign Application Priority Data

Mar. 14, 2014 (EP) .................................... 14275060
Mar. 14, 2014 (GB) .................................. 1404525.6

(51) Int. Cl.
*G02B 6/08* (2006.01)
*G02B 6/34* (2006.01)
*G02B 27/01* (2006.01)

(52) U.S. Cl.
CPC ................ *G02B 6/08* (2013.01); *G02B 6/34* (2013.01); *G02B 27/0172* (2013.01)

(58) Field of Classification Search
CPC ..................................................... G02B 6/08
See application file for complete search history.

(56) References Cited

U.S. PATENT DOCUMENTS

| 4,247,165 A | 1/1981 | Versluis |
| 4,904,049 A | 2/1990 | Hegg |
| 5,274,405 A | 12/1993 | Webster |

(Continued)

FOREIGN PATENT DOCUMENTS

| EP | 0036242 A2 | 9/1981 |
| EP | 0357070 A2 | 3/1990 |

(Continued)

OTHER PUBLICATIONS

International Preliminary Report on Patentability received for Patent Application No. PCT/GB2015/050720 dated Sep. 22, 2016. 9 pages.

(Continued)

*Primary Examiner* — Jerry Rahll
(74) *Attorney, Agent, or Firm* — Finch & Maloney PLLC

(57) ABSTRACT

An optical diffuser (1) including a fiber-optical piece comprising: a first face (2) and a second face (3); a plurality of substantially parallel optical fibers (4) each extending along a respective optical axis (13) from an input end of the optical fiber exposed at the first face of the fiber-optical piece to an output end of the optical fiber exposed at the second face of the fiber-optical piece; an input optical diffraction grating (10A) positioned adjacent to the first face of the fiber-optical piece to extend over at least a part thereof such that light diffracted by the input optical diffraction grating is directed into optical fibers of the plurality of optical fibers in a direction oblique to said optical axes.

22 Claims, 5 Drawing Sheets

(56) References Cited

U.S. PATENT DOCUMENTS

| | | |
|---|---|---|
| 5,321,251 A | 6/1994 | Jackson et al. |
| 5,517,347 A | 5/1996 | Sampsell |
| 5,535,025 A | 7/1996 | Hegg |
| 6,215,593 B1 | 4/2001 | Bruce |
| 7,359,123 B1 | 4/2008 | Mitchell et al. |
| 8,009,949 B1 | 8/2011 | Peng et al. |
| 2002/0186465 A1 | 12/2002 | DeSanto et al. |
| 2003/0025885 A1 | 2/2003 | Cotton et al. |
| 2004/0141712 A1 | 7/2004 | Biscardi et al. |
| 2009/0322987 A1 | 12/2009 | Dunn et al. |
| 2013/0100524 A1 | 4/2013 | Magarill et al. |

FOREIGN PATENT DOCUMENTS

| | | |
|---|---|---|
| EP | 0491662 A2 | 6/1992 |
| EP | 1376168 A1 | 1/2004 |
| EP | 2196729 A1 | 6/2010 |
| JP | H110319343 A | 12/1998 |
| JP | 2006084563 A | 3/2006 |
| WO | 8400615 | 2/1984 |
| WO | 8400616 | 2/1984 |
| WO | 8706017 | 10/1987 |
| WO | 2015136258 A1 | 9/2015 |
| WO | 2015136288 A1 | 9/2015 |

OTHER PUBLICATIONS

International Preliminary Report on Patentability received for Patent Application No. PCT/GB2015/050686 dated Sep. 22, 2016. 9 pages.

International Search Report and Written Opinion received for Patent Application No. PCT/GB2015/050686, dated Jun. 2, 2015. 15 pages.

GB Intellectual Property Office Search Report under Section 17(5) received for GB Patent Application No. 1404526.4 dated Sep. 16, 2014. 4 pages.

Extended European Search Report received for EP Patent Application No. 14275062.9 dated Sep. 29, 2014. 8 pages.

International Search Report and Written Opinion received for Patent Application No. PCT/GB2015/050720, dated May 22, 2015. 14 pages.

GB Intellectual Property Office Search Report under Section 17(5) received for GB Patent Application No. 1404525.6 dated Sep. 16, 2014. 3 pages.

Extended European Search Report received for EP Patent Application No. 14275060.3 dated Oct. 6, 2014. 6 pages.

$\phi(x) = \phi_0 + \Delta\phi \, sq\text{-}sin(2\pi x/d)$

DISPLAYS

FIELD OF THE INVENTION

The invention relates to optical diffusers for use in optical displays, such as projection display devices. The invention is relevant to, for example, helmet-mounted display (HMD) devices and methods.

BACKGROUND

Projection display technologies may sometimes require complex optical geometries to fit around obstacles to a linear optical path. An example is the optical geometry used on some helmet-mounted display (HMD) devices in order to "bend" image-bearing light around the helmet. These optical geometries must direct image-bearing light from an image source to a projection screen or mirror on a helmet. The optics may incorporate a display device that has a restricted Etendue, due to the constraints imposed on the optical geometry by the shape of the helmet. The Etendue, in these circumstances, may be too small to fully illuminate the exit pupil of the projection optics. This is one example of a scenario in which a restricted Etendue can arise.

The Etendue of an optical system can be defined as follows. From the point of view of a light source, it is the area of the source times the solid angle subtended by the entrance pupil of the system as seen from the source. From the system point of view, the Etendue is the area of the entrance pupil times the solid angle the light source subtends as seen from the pupil. A perfect optical system produces an image with the same Etendue as the source. The term has a general meaning of "geometrical extent". Other names for this property are "acceptance", "throughput", "light-grasp", "collecting power", and "optical extent", as are well known in the art.

BRIEF DESCRIPTION

In a first aspect, the present invention provides an optical diffuser including a fibre-optical piece comprising: a first face and a second face; a plurality of substantially parallel optical fibres each extending along a respective optical axis from an input end of the optical fibre exposed at the first face of the fibre-optical piece to an output end of the optical fibre exposed at the second face of the fibre-optical piece; an input optical diffraction grating positioned adjacent to the first face of the fibre-optical piece to extend over at least a part thereof such that light diffracted by the input optical diffraction grating is directed into optical fibres of the plurality of optical fibres in a direction oblique to said optical axes.

The limited Etendue may be improved by projecting the display image onto a diffuser which increases the Etendue before the image is projected into the eye by projection lenses.

The oblique angle by which diffracted rays of light are transmitted into the fibres, acts in synergy with the optical processes that take place within the fibre. Because the fibres act to project those oblique angles in a substantially rotationally symmetrical output beam, the oblique input angle of the rays relative to the optical axes of the optical fibres will substantially increase the effective Etendue of the optical system. Therefore the selection/choice of a diffraction angle oblique to the optical axis of the optical fibres, offers greater choice over the amount of optical diffusion.

Preferably the input diffraction grating may be arranged to diffract incident light in principally, predominantly or mostly into one angular direction relative to the grating (e.g. one diffractive order, such as the first order of diffraction) for entry into the fibre-optical piece, alone. The action of the internal structure of the fibre-optical piece may thus replicate that directional light pattern over multiple angles so as to diffuse the output beam into a generally rotationally symmetrical pattern (e.g. a light cone at output). The optical diffuser may thereby further increase the effective Etendue of an optical system. An advantage of this arrangement is that a relatively simple diffractive structure may be employed to diffuse the output beam in any one of many directions with high efficiency.

Preferably, the diffraction efficiency of the $0^{th}$ (zero$^{th}$) diffraction order of the input optical diffraction grating is less than the diffraction efficiency of the $1^{st}$ (first) diffraction order thereof in respect of optical wavelengths of light.

The diffraction efficiency of the $1^{st}$ (first) diffraction order of the input optical diffraction grating may be greater than the diffraction efficiency of any other diffraction order thereof in respect of optical wavelengths of light.

The diffraction efficiency of the $0^{th}$ (zero$^{th}$) diffraction order of the input optical diffraction grating may be less than 10% and the diffraction efficiency of the $1^{st}$ (first) diffraction order thereof may be greater than 20% in respect of optical wavelengths of light.

The input optical diffraction grating preferably comprises a varying phase profile defining a variation extending in no more than one dimension.

By the term "phase profile" is a well-known term in the art and is meant preferably to refer to a variation in the structure or properties of the diffraction grating which causes a variation in the optical path lengths in an optical wavefront transmitted through the grating so as to impose a variation to wavefront of light when output from the grating, having passed through the phase profile. This may be implemented as a variation in the optical thickness of the grating surface caused by the presence of a pattern of grooves, or as a variation in the refractive index of the material of the grating.

The phase profile may comprise an array of substantially parallel grooves formed in a surface of the diffraction grating, or may comprise an array of substantially parallel linear regions within the grating material which have a relatively higher refractive index value as compared to the rest of the material of the grating.

The input optical diffraction grating may comprise a square-wave phase profile. This may be implemented as an array of grooves formed in the surface of the grating, and having a substantially square-wave spatial profile or shape.

The optical diffuser may comprise an output optical diffraction grating positioned adjacent to the second plate face to extend over at least a part thereof such that light output by the optical fibres of the plurality of optical fibres is diffracted thereby in a direction oblique to said optical axes. For example, the optical diffuser may comprise a preparation coated onto the second face of the fibre-optical piece. This may be an optical diffraction grating arranged to diffuse incident light by diffraction. Preferably such a diffraction grating may be arranged to diffract incident light from optical fibres in principally, predominantly or mostly into one angular direction relative to the grating (e.g. one diffractive order, such as the first order of diffraction) for output from the optical diffuser. The action of the internal structure of the fibre-optical piece may produce a generally rotationally symmetrical output light beam that may then be expanded in the one angular direction only by the output diffraction grating. The overall effect may be to produce an elliptical output beam that is offset sideways in one direction. An advantage of this arrangement is that the relative alignment of the internal structure of the optical diffuser with the direction of the grating lines of the diffraction grating provides multiple possible/selectable alignments of the elliptical axes of the output beam with its offset.

The input end of each said optical fibre may present a substantially plane input face which is substantially parallel to said first face of the fibre-optical piece. The output end of each said optical fibre may present a substantially plane output face which is substantially parallel to said second face of the fibre-optical piece. The first face of the fibre-optical piece is preferably substantially plane. The second face of the fibre-optical piece may be substantially plane. The first face of the fibre-optical piece may be substantially parallel to said second face of the fibre-optical piece.

The first face of the fibre-optical piece may be angled or oriented differently to the second face of the fibre-optical piece such that the two are not parallel and the one is inclined relative to the other. The first and/or second face of the fibre-optical piece may be curved. Thus, the angle of obliquity of the optical axes of the optical fibres relative to the diffracted light entering the first surface of the optical piece may vary across the aperture of the optical diffuser.

The advantage is that the curved shapes may better interact with the optical aberrations in optical sub-systems used to project light onto the optical diffuser and/or optical sub-systems used to project light away from the optical diffuser.

The input end of each said optical fibre may present a substantially plane input face. The output end of each said optical fibre may present a substantially plane output face which is substantially parallel to said input face thereof. The input end of each one of said optical fibres may present a substantially plane input face which is substantially parallel to a said input face of each of the other said optical fibres. The output end of each one of said optical fibres may present a substantially plane output face which is substantially parallel to a said output face of each of the other said optical fibres.

The plurality of substantially parallel optical fibres are preferably fixed together side-by-side. Neighbouring fibres may be fused together at their outer surfaces. The fibres are preferably clad optical fibres, and may be single-mode optical fibres.

The first face of the fibre-optical piece or the second face of the fibre-optical piece, or both, may be fabricated with a curved shape to facilitate the compensation of aberrations in the optics projecting light onto input face, and/or in the optics projecting light towards an observer from the output face.

The first face of the fibre-optical piece may be angled relative to the second face of the fibre-optical piece to better focus image-bearing light across the field of view. That is to say, the appropriate choice of angle may assist in coupling optical elements that provide input light to the fibre-optical piece, to optical elements that the fibre-optical piece subsequently outputs light to—such as in a projection system.

The angle of the second (e.g. output) face of the fibre-optical piece relative to the optical axis of the fibres may be arranged to refract the output (projected) light pattern in a direction that is adapted to the geometry of an output projection optics (if used) arranged to receive that output light.

The plurality of substantially parallel optical fibres may have a shape whereby their cross-section is not circular.

The plurality of substantially parallel optical fibres may be arranged such that the size (e.g. diameter) of the fibres and the space between them (e.g. transverse distance/separation between neighbouring fibres) varies (e.g. increases or decreases) throughout the depth of the fibre array (e.g. from the input end to the output ends of the fibres).

The plurality of substantially parallel optical fibres may comprise axially twisted fibres in which the twisted fibres are structured with an axial twist about their optical axis.

The plurality of substantially parallel optical fibres may each be bent whereby the axis of the optical fibres presented at the first face of the fibre-optical piece is not parallel to the axis of the optical fibres presented at the second face of the fibre-optical piece.

The fibre-optical piece (e.g. plate) may comprise: a first face (e.g. plate face) and a second face (e.g. plate face); a plurality of substantially parallel optical fibres each extending along a respective optical axis from an input end of the optical fibre exposed at the first face to an output end of the optical fibre exposed at the second face; wherein said optical axes of each of said plurality of optical fibres are inclined at a common oblique angle relative to at least one of the first face and the second face, such that light incident substantially perpendicularly upon the at least one said face enters said optical fibres in a direction oblique to said optical axes. The angle of inclination of the first face of the fibre-optical piece relative to the optical axes of the fibres determines the angles by which rays of light are transmitted into the fibres, when the optical diffuser is illuminated by a given orientation of illumination. Because the fibres act to project those angles in a substantially rotationally symmetrical output beam, the angle of the first face relative to the optical axes of the optical fibres will substantially increase the effective Etendue of the optical system. The angle/inclination of the second face may preferentially refract the resultant diffusion pattern in a different direction. Therefore the selection/choice of different inclination angles of the optical axis of the optical fibres relative to the first and second faces of the fibre-optical piece respectively, offers greater choice over the amount of optical diffusion and the direction into which it is scattered.

In a second aspect, the invention may provide a projection display apparatus comprising: a light source means for generating light to be displayed; an optical diffuser as described above arranged to receive at said first face of the fibre-optical piece said light from said light source and for outputting said light from said second face of the fibre-optical piece, for display by projection.

The light source means may define a display optical axis along which said generated light is transmitted to the optical diffuser. The projection display apparatus may include projection optical means defining a projection optical axis and arranged for receiving said output light from the optical diffuser and for projecting the received light for display by projection. The projection optical axis may be oblique to the display optical axis. The optical diffuser, if employing said output optical diffraction grating described above, may be arranged to output light towards the projection display means in a direction substantially parallel to the projection optical axis.

The projection display apparatus may include a projection screen or mirror onto which said projection optical means is arranged to project said light for display thereat. The mirror may be a curved mirror onto which said projection optical means may be arranged to project said light for reflection to an observer.

In a third aspect, the invention may provide a helmet-mounted display comprising an optical diffuser as described above, or a projection display apparatus as described above.

In a fourth aspect, the invention may provide a method of diffusing light using an optical diffuser, the method comprising: providing a fibre-optical plate including a first face of the fibre-optical piece and a second plate between of the fibre-optical piece which extend a plurality of substantially parallel optical fibres each extending along a respective optical axis from an input end of the optical fibre exposed at the first face of the fibre-optical piece to an output end of the optical fibre exposed at the second face of the fibre-optical piece; providing an input optical diffraction grating positioned adjacent to the first face of the fibre-optical piece to extend over at least a part thereof; directing light so as to be incident upon the input optical diffraction grating such that light diffracted by the input optical diffraction grating is directed into optical fibres of the plurality of optical fibres in a direction oblique to said optical axes thereby to provide said light in diffused form at the second face of the fibre-optical piece. The optical diffuser may be as described above in relation to the invention in its first aspect.

In a fifth aspect, the invention may provide a method of projecting light for display comprising: generating light to be displayed; transmitting said light along a display optical axis to an optical diffuser as described above; receiving said transmitted light at said input optical diffraction grating and therewith diffracting the received light; receiving said diffracted light at said first face of the fibre-optical piece of the optical diffuser; outputting said light from said second face of the fibre-optical piece thereof in a direction towards a projection optical means; and, receiving at the projection optical means said output light from said second face of the fibre-optical piece and outputting the received light for display by projection; projecting said light upon a projection screen or mirror for display thereat. The method may comprise projecting said light upon a curved mirror for reflection to the observer.

The method may include receiving said light output from the second face of the fibre-optical piece at said output optical diffraction grating (when optionally provided) and thereat diffracting said light in a direction oblique to the optical axes of the optical fibres and oblique to the display optical axis towards the projection optical means.

To summarise, the present invention uses reflections from the sides of the optical fibres to diffuse and extend the far-field light pattern with minimal loss in image-carrying information in the near-field light pattern. This is advantageous in helmet-mounted displays and head-up displays in extending the Etendue of a projection system such that a small image generation device may illuminate a large exit pupil, through which an observer views the projected image.

DETAILED DESCRIPTION

Figure 1:
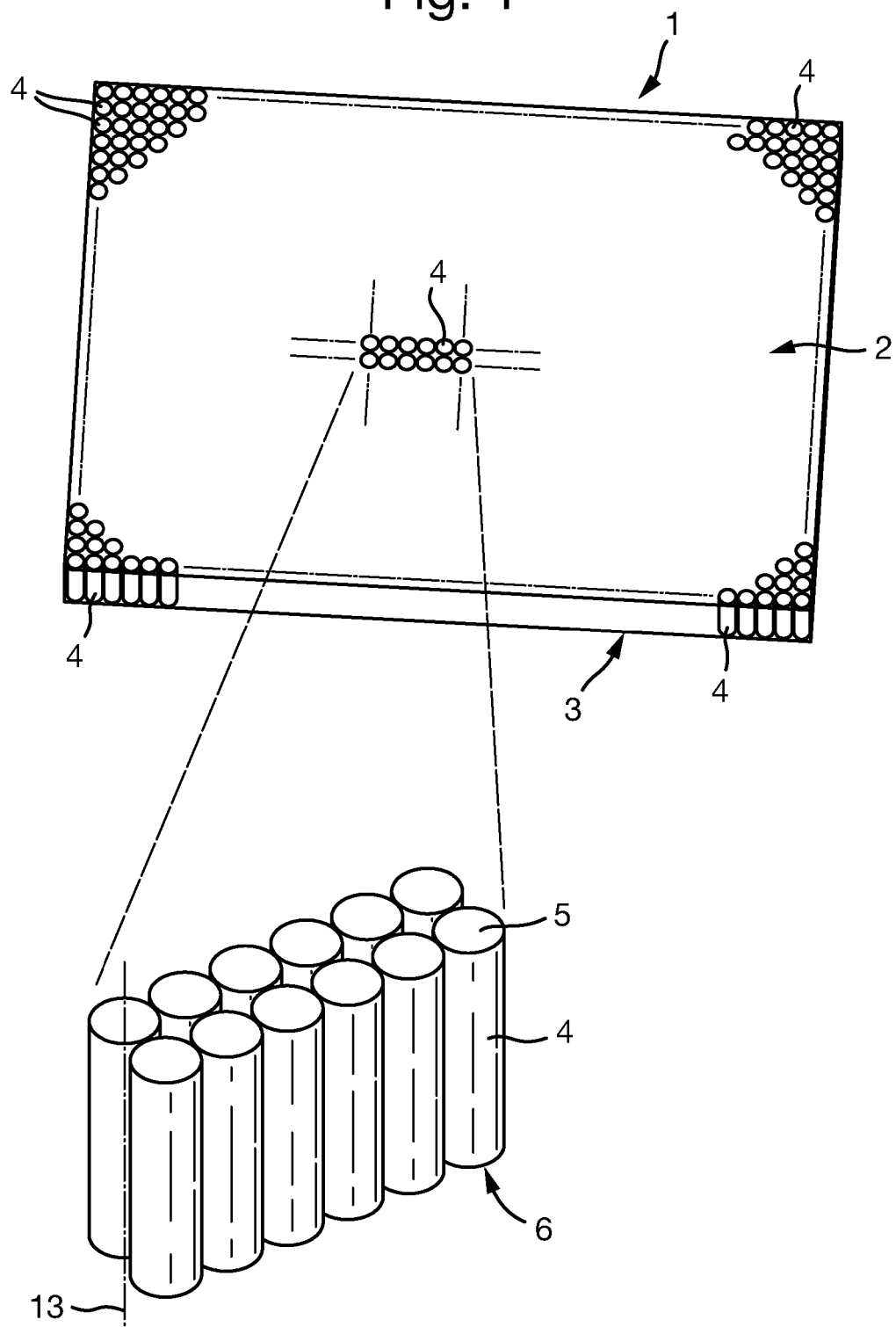
FIG. 1 schematically illustrates a perspective view of a fibre-optical faceplate.

In the drawings, like items are assigned like reference symbols.

FIG. 1 schematically illustrates a fibre-optical piece in the form of a fibre-optical face plate of an optical diffuser 1. The face plate is a rectangular plane, transparent plate including a first plate face 2 and an opposite, plane-parallel second plate face 3. The two plate faces are bounded by a rectangular peripheral edge. The plate is formed from a multiplicity of substantially parallel, linear optical fibres 4 each extending in parallel along a respective optical axis of the given fibre, from the first plate face to the second plate face.

The optical fibres are fused together side-by-side in parallel orientation such that the optical axes of all fibres are substantially parallel.

Each optical fibre presents a substantially plane input face 5 at an input end of the fibre, and a substantially plane output face at the output end of the fibre 6, which is parallel to the input face. The input faces of each of the optical fibres are mutually plane-parallel and define the planar first pate surface. Similarly, the output faces of each of the optical fibres are mutually plane-parallel and define the planar second pate surface.

Figure 2:
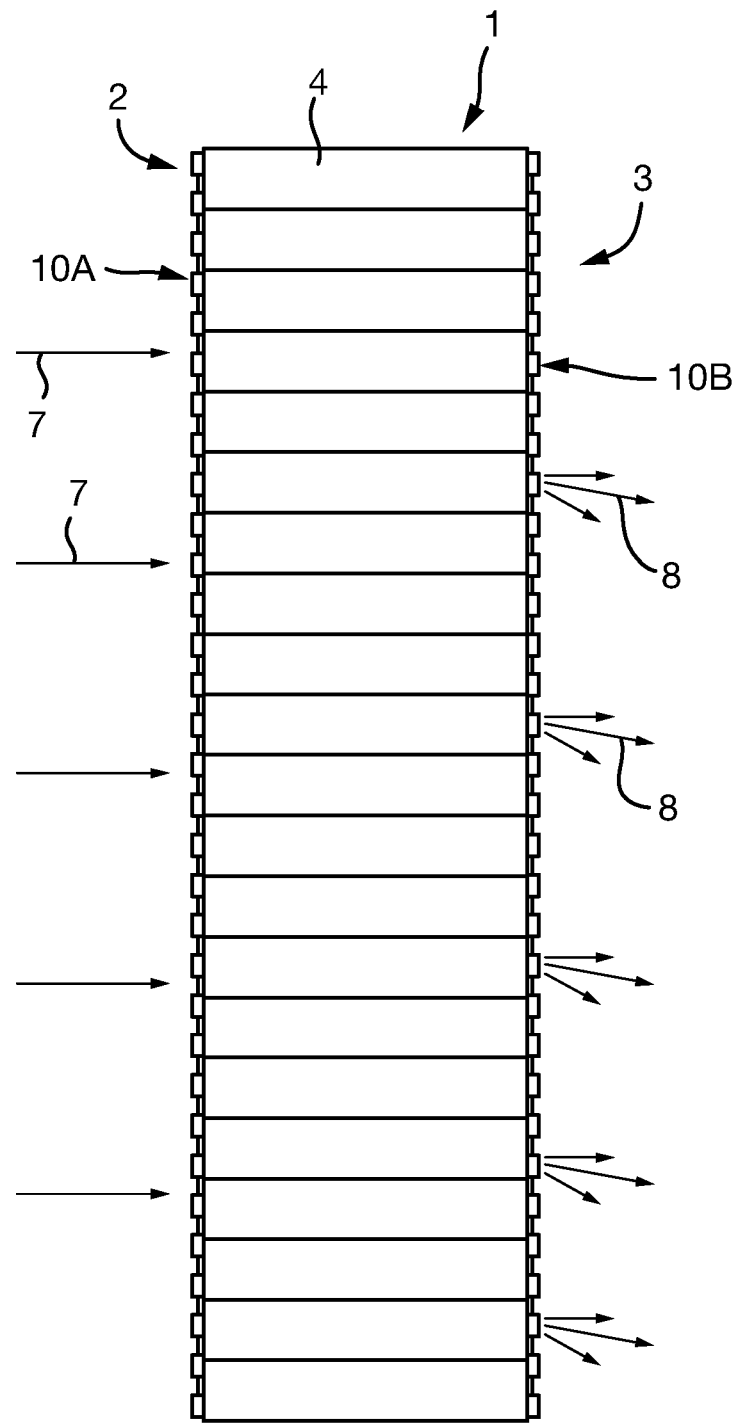
FIG. 2 schematically illustrates a side view of the fibre-optical faceplate of FIG. 1.

Referring to FIG. 2, there is shown a schematic side-view of an optical diffuser comprising the fibre-optical piece of FIG. 1 together with an input diffraction grating 10A extending over the first plate face being substantially parallel thereto and, optionally, an output diffraction grating 10B extending over the second plate face being substantially parallel thereto.

Image-bearing light 7 is shown incident perpendicularly upon the input diffraction grating 10A and, thence, the first plate face, and diffused light 8 is shown output from the second plate face and thence the output diffraction grating 10B. The optical axes 13 of the optical fibres, which correspond with the longitudinal fibre axis of each respective fibre, is oriented substantially perpendicularly relative to the plane of the first and second plate faces (2, 3). The input diffraction grating 10A comprises an array of linear, regular and periodically arranged grating grooves defining a square-wave phase profile. The grating lines extend in one dimension across, and substantially parallel to, the plane surface of the first plate face of the fibre-optical piece. The phase profile is arranged such that light 7 of an optical wavelength incident upon the input diffraction grating is diffracted predominantly into the first diffraction order by the grating. Consequently, the predominant first order of diffracted light enters the input surface of an adjacent optical fibre at the first plate face, in a direction oblique to the optical axes of the optical fibres of the face plate as is shown schematically in FIG. 3.

In preferred embodiments, the second plate face of the fibre-optical piece may bear an output diffraction grating upon it. The input diffraction grating and (if used) the output diffraction grating, may be formed as a surface preparation or fluid coating upon the first (and second) plate face into which may be stamped the required phase profile which is then cured. Thus, the desired grating structure displaying the desired efficiency of diffraction into the appropriate diffraction order, may be applied to either of the first and second plate faces. In alternative embodiments, a pre-prepared diffraction grating may be employed. In this case, it is preferable to optically bond of affix the diffraction grating to the appropriate plate face using an appropriate optical bonding agent and thereby avoid air gaps between the grating and the plate face it extends over. Reflection at the interface between the grating and the plate face are reduced in this way.

The output diffraction grating 10B is illustrated schematically in FIG. 2, but may be omitted if desired. The output diffraction grating comprises an array of linear, regular and periodically arranged grating grooves defining a square-wave phase profile. The grating lines extend in one dimension across, and substantially parallel to, the plane surface of the first plate face of the fibre-optical piece. The phase profile is arranged such that light of an optical wavelength incident upon the output diffraction grating, from the second plate face, is diffracted predominantly into the first diffraction order by the grating. Consequently, the predominant first order of diffracted light exits the optical diffuser in a direction oblique to the optical axes of the optical fibres of the face plate as is shown schematically in FIG. 3.

The output diffraction grating may be substantially identical in structure and/or optical properties to the input diffraction grating, but need not be and may be arranged to optimise the efficiency of diffraction into a different angle or order of diffraction with which it diffracts image-bearing light entering it from the second face plate. A benefit of employing the output diffraction grating is that the image-bearing light may be diffracted in to a non-zero order of diffraction (e.g. the first order) in a chosen direction oblique to the optical axes of the optical fibres of the face plate (i.e. oblique to the normal to the plane of the second plate face) and directed towards subsequent optical elements, such as projection optical elements, which are intended to receive the image-bearing light but are axially offset due to spatial constraints. While the act of diffusing the image-bearing light via the input diffraction grating and the fibre-optical face plate, serves to increase the effective Etendue of the optical system, so the re-directing effect of diffraction of the diffused image-bearing light by the output diffraction grating can be put into service to better couple that light into an off-axis subsequent optical element(s).

Figure 3:
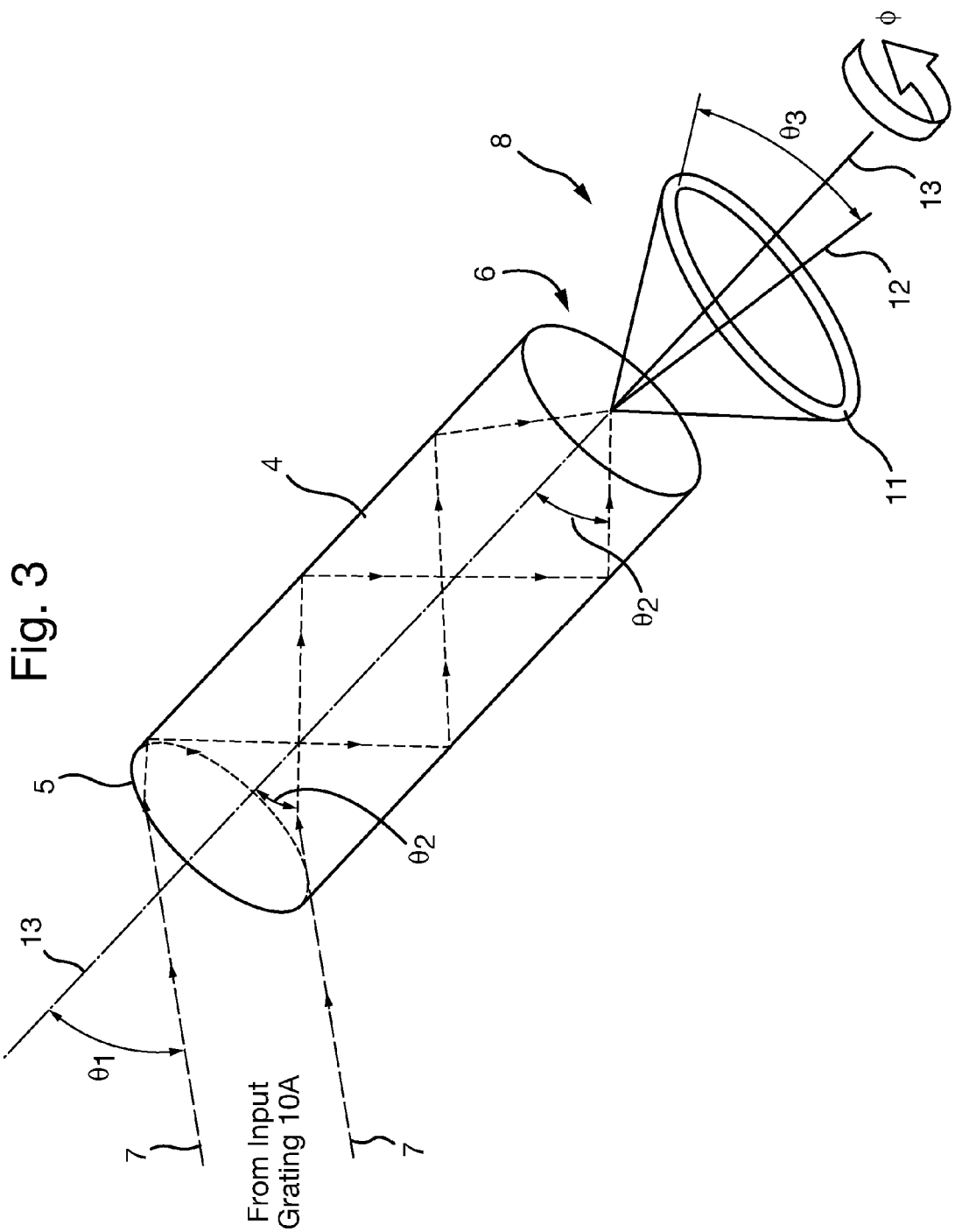
FIG. 3 schematically illustrates a perspective view of an optical fibre of the faceplate of FIG. 1.

The incident light 7 enters each of the optical fibres 4 in a direction oblique relative to the common optical axis of each fibre. FIG. 3 schematically illustrates the effect of this oblique entry angle. In general, light that enters an optical fibre 4 obliquely from the input diffraction grating in the first order of diffracted light. As the incident light enters the fibre it is refracted at an input angle as it refracts through the input face. In FIG. 3, the diffraction grating is shown as separated from the input surface. This is for clarity of illustration only, and in preferred embodiments, the input diffraction grating is formed upon each of the input surface of the collection of optical fibres forming the first plate face.

The light intersects the cylindrical surface of the fibre internally at multiple positions along its length as it propagates therealong, such that multiple reflections at the multiple respective positions create a cone of ray angles from a single input ray angle. The light then reaches the output face of the optical fibre where it refracts through the output face at an output angle generally different to the input angle. If an output diffraction grating is employed, the light output from the optical fibre will then enter the output diffraction grating (not shown) and be diffracted thereby.

FIG. 3 schematically illustrates the effect of this inclined entry angle. In general, light that enters an optical fibre 4 is refracted at a different angle as it refracts through the input face. It intersects the cylindrical surface of the fibre at multiple positions, such that multiple reflections working on each of the multiple positions create a cone of ray angles from a single input ray angle.

The light is refracted at a different angle as it refracts through the output face.

The two rays of light 7 shown in FIG. 3 enter the fibre in a parallel direction, such that before refraction they make a common angle $\theta_1$, and after refraction they make a common angle $\theta_2$ with the optical axis 13 of the fibre. The two rays experience a different number of reflections from the outside of the fibre such that they exit at different positions on the projected light pattern 11. The action of diffraction, and different refraction at the input face over different wavelengths of light broadens the shape of the projected light pattern 11, so it is drawn with a thicker geometry.

The action of refraction and reflection maintains the angle of the output rays to closely match the angle of the input rays, so the size of the projected light pattern 11 has a substantially the same output semi-angle of $\theta_2$ within the fibre, which is refracted by the output face to an angle $\theta_3$.

All of the possible rays entering the fibre with this angle will experience different intersection points with the outside cylindrical surface of the fibre, and will experience differing numbers of reflections, such that the rays become diffused through 360 degrees in azimuth angle $\phi$ about the optical axis 13 to define a hollow cone 11 of light. The shape of the projected beam pattern is therefore substantially a conical shape of diameter $2 \times \theta_3$. The conical output beam will substantially have an axis of rotational symmetry 12.

In the case shown, where the input face 5 of the fibre and the output face 6 are both parallel to each other and at 90 degrees to the axis 13, the angle $\theta_1$ has the same value as $\theta_3$; and axis 12 lies in a coincident direction with axis 13. In other embodiments, e.g. where the input face 5 of the fibre and the output face 6 are both parallel to each other and are not at 90 degrees to the axis 13, the axis 12 of symmetry may be refracted by the output face so it is no longer parallel to the axis of the fibre 13 (as shown for illustration).

It should be noted that it is not essential to the invention that the rays 7 intersect each other within the fibre, nor that they intersect each other at the output face 6. The optical diagram is an illustrative schematic representation exemplifying the optical principles involved as will be appreciated by those skilled in the art who will recognise shape 11 as the far field projected light pattern, which is measured sufficiently far away from the fibre for the size of the output face 6 to be insignificant.

The described optical geometry is common to normal understanding of how to model an optical fibre's function. This causes a nominal hollow cone of light to be projected from the output face of a fibre. The hollow centre of the projected light pattern 11 becomes filled-in by projecting rays 7 into the fibre from a range of angles, so that the overall effect is to project a filled in cone of light. This may be achieved by focusing a cone of light onto the input face 5. The focusing effect, over an array of fibres, may cause the image information in the input beam to be maintained as the light is transmitted through the array of fibres. The image information is then projected out of the fibre array with an increased effective Etendue.

It should be noted that it is not essential to the invention that the rays 7 intersect each other within the fibre, nor that they intersect each other at the output face 6. The optical diagram is a schematic simplification intended to aid an understanding of the invention and the skilled in the art will recognise that the shape of the output light cone 11 in the drawings represents the far field projected light pattern, which is measured sufficiently far away from the fibre for the size of the output face 6 to be insignificant. This optical geometry causes a hollow cone of light to be projected from the output face. The hollow centre of the projected light pattern 11 is filled in by projecting rays 7 into the fibre from a range of angles, so that the overall effect is to project a filled in cone of light. This may be achieved by focusing a cone of light onto the input diffraction grating, for input to the first plate face of the fibre-optical face plate. The focusing effect, over an array of fibres, causes the image information in the input beam to be maintained as the light is transmitted through the array of fibres. The image information is then projected out of the fibre array (and optionally redirected using an output diffraction grating) with an increased effective Etendue.

In a preferred embodiment the fused fibre optic faceplate with parallel sides and comprises optical fibres having a diameter of 4 microns. The optical thickness of the faceplate is preferably 0.4 mm. The fibres are oriented substantially parallel to the surface normal of the faceplate.

The optical face plate may be constructed by placing and fixing multiple fibres parallel to each other as described above. Each of the multiple fibres would have its input and output faces coplanar with the input and output faces of the other fibres. The overall geometry would be of a flat and parallel plate whose fibres are all at a common right angle to the input and output faces of the substrate of the diffuser.

Figure 4:
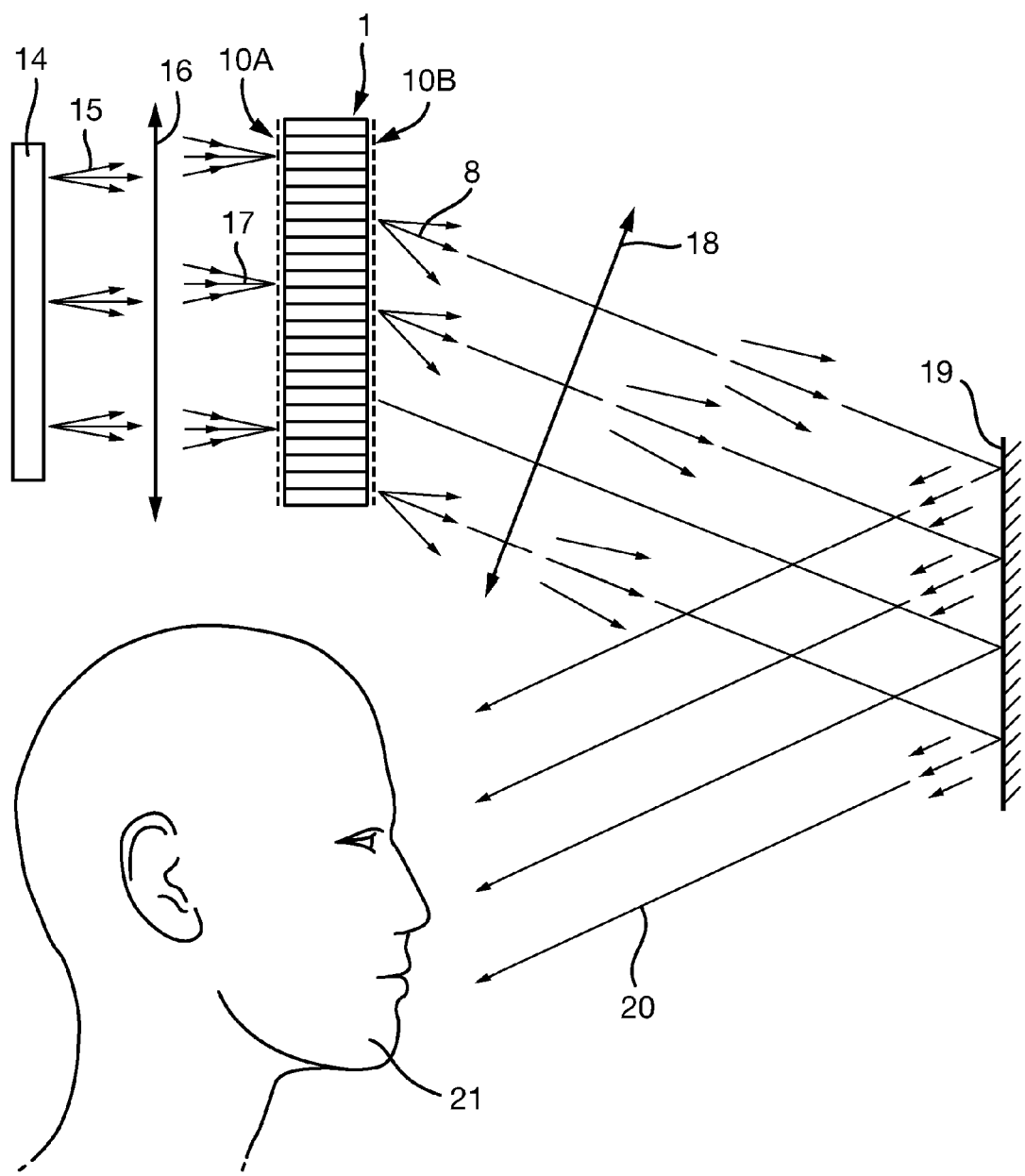
FIG. 4 schematically illustrates the operation of a helmet-mounted display (helmet omitted for clarity)

FIG. 4 schematically illustrates an application of the optical diffuser in a helmet-mounted display (HMD) which employs an optical train lacking rotational symmetry. This lack of symmetry arises because of the need to direct light from an optical display 14 to some extent around the helmet for projection onto a projection display mirror 19 (e.g. a helmet visor) that reflects the image-bearing light to be viewed by the helmet wearer.

The helmet mounted display (helmet not shown, for clarity) comprises an optical display screen arranged for generating image-bearing light 15 to be displayed at the eye of the wearer after reflection from a helmet visor 19 of the helmet. A train of display optical element(s) 16 such as a lens/lenses and/or a mirror/mirrors as appropriate is arranged to receive image—bearing light from the display screen and to transmit that light along a display optical axis 17 defined by the train of display optical elements, to an optical diffuser 1 as described above. The light is focussed by the display optical elements 16 onto the first (input) surface of the optical diffuser as an image.

It is to be understood that in the schematic representation of FIG. 4, all rays within a particular ray bundle input to the optical sub-system 16 may or may not correspond with all rays within a given ray bundle projected through the optical sub-system 16. Rays in the latter ray bundle may originate from other rays within ray bundles other than the former ray bundle.

The optical diffuser 1 is arranged along the display optical axis 17 to receive the transmitted light at the input diffraction grating 10A and first plate face 2 of the optical diffuser oriented substantially, though not necessarily, perpendicular to the display optical axis. Consequently, the optical diffuser may output the light from its second plate face 3 and thence from the output diffraction grating 10B in a direction along a projection optical axis 8 towards a projection optical train 18 which defines the projection optical axis. The projection optical train comprises optical element(s) 18 such as a lens/lenses and/or a mirror/mirrors as appropriate. The projection optical axis is oblique to the display optical axis. Image-bearing light received at the projection optical train 18 from the second plate surface is projected thereby for display an internal wearer-facing surface of the helmet visor which serves as a mirror for display to the wearer.

Due to the non-rotational symmetry of the optical system, it is not necessary for the optical axes 8 or 17 (FIG. 6) to be oriented at 90 degrees to the plane of optical diffuser 1 (i.e. perpendicular), nor to intersect the centre of the image formed on the input face 5 or output face 6 of said optical diffuser.

FIG. 4 shows that the rays input to the optical diffuser 1, surrounding the optical axis 17, are drawn at a smaller angular range than the rays leaving the optical diffuser 1. This is schematically indicating the effective increase in effective Etendue caused by the action of the individual fibres within the fibre array. This is advantageous in increasing the size of the light pattern that irradiates the observer's eye. In addition, the action of the angled fibres redirects the light towards the best position to illuminate the observer's eye.

This combination is advantageous in illuminating the observer's eye over all positions that it is likely to be placed, whilst keeping the illuminated area to the smallest size, thus the eye is illuminated under all conditions with the brightest image.

In this way, the optical diffuser serves to improve the efficiency of the coupling of light from a display optical train/geometry to a projection optical train/geometry when those two geometries are offset and do not share a rotational symmetry.

It will be appreciated by the skilled person that whilst the optical property generally known as the Generalised Lagrange Invariant is not increased by the action of refraction and reflection in the fibre, the angular size of the far field light pattern 11 (FIG. 3) is increased. This apparent conflict, whereby the overall optical system has an effective increase in Etendue, but the ray trace through the fibre array does not have an increase in the Etendue, does not actually occur because the output face of each optical fibre 4 is non-uniformly illuminated for each set of parallel input rays 7. To apply a simple but illustrative analogy, the output optical field maybe thought to act like a kaleidoscope with fine structure on the optical field across the aperture of output face 6. However, this fine structure is too small to be seen by the observer 21, and is averaged to a more uniform distribution of image information by the action of encoding image bearing information on the input beam with coarser resolution than the dimensions of the aforesaid light structure. In addition, diffraction within the fibre causes the light structure to be averaged so as to fill in the darker areas and reduce the brighter areas. The optical diffuser 1 therefore acts to effectively increase in the Etendue of the optical system. The illustrations presented here are to help aid a better understanding of the general principles involved when implementing the invention The optical axes of each of the fibres of the fibre-optical face plate are perpendicular to the plane of each of the first and second plate faces—which are mutually parallel. This type of fibre-optical face plate is readily available to the skilled person. They are commonly available from a variety of suppliers who use different methods in their fabrication. One such supplier is Schott AG, in Germany. They may be purchased in a variety of forms. A typical method of their manufacture is to draw a single fibre from molten glass and allow it to cool and solidify. Two glasses are drawn together to provide a fibre core and an outer fibre cladding. The fibre is wound round a large diameter drum taking care that it lays down in an ordered fashion. The collection of fibres is heated to melt the cladding, allowing the cladding of one fibre to fuse together with that of its neighbouring fibres. This fuses the fibres into one body. The arrangement of fibres is sufficiently accurate to enable the transmission of an image from one face of the part to another face without the image breaking up. The fused part of the fibres is removed from the drum and cut, ground and polished to its final form. The fibres are typically quite small to enable high resolution image transmission. However, they are usually too large to create a single optical mode inside the fibre core. The cladding may be treated with an absorbing material to prevent light passing from one fibre to an adjacent fibre.

Thus, the invention may address a problem that arises in HMDs to increase the Etendue of an optical system. The result is to increase the exit pupil size to allow for comfortable viewing.

Preferred embodiments of the invention may use a fused fibre optic device, which is an optical substrate, of any desired shape, comprising e.g. millions of fibres arranged to transmit an image from one side to the other. In its most basic form, each input ray undergoes multiple reflections within each fibre, and the output angle generally equals the input angle. A significant effect is the diffraction from each separate fibre. Each ray going through the fibre at slightly different angles experiences a different optical path, and therefore a different phase retardation, which averages any localised interference effects within the fibre. Thus, each fibre acts as an incoherent aperture. Because of its necessarily small size, this diffracts the output light over a significant further angle.

The diffracted light rays entering the fibres of the optical substrate are positioned at an oblique angle to the original light/image projection axis, when used in a projector display apparatus. The light may be refracted through the first face of the optical substrate as normal but is then reflected inside the fibres. Therefore most rays are intersecting the fibres at an angle which causes most rays to be projected out as an annular projected light field. The effect of angling the fibres therefore increases the effective diffusion properties of the device.

Figure 5A:
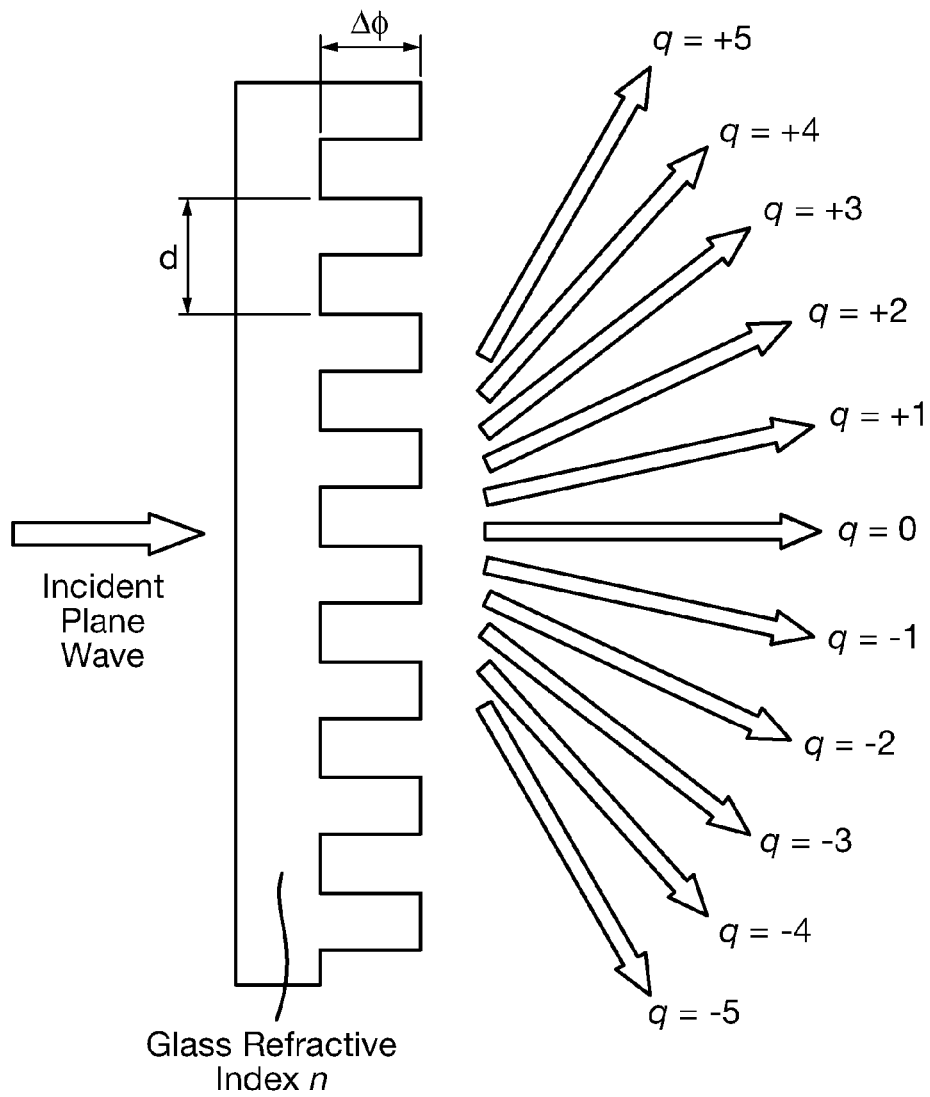
FIG. 5A schematically illustrates an input diffraction grating (10A) in cross section. This is also, optionally, the structure of an optional output diffraction grating (10B)

FIG. 5A schematically illustrates a diffraction grating suitable for use as the input diffraction grating on the first plate face, and optionally as the output diffraction grating on the second plate face or the fibre-optical face plate. It is in the form of a phase profile in one dimension only. For example, it is well known that a square wave diffraction grating has the following properties:

$$\phi(x) = \phi_0 + \Delta\phi \times \text{square sin}(2\pi x/d)$$ Eq. 1

Figure 5B:
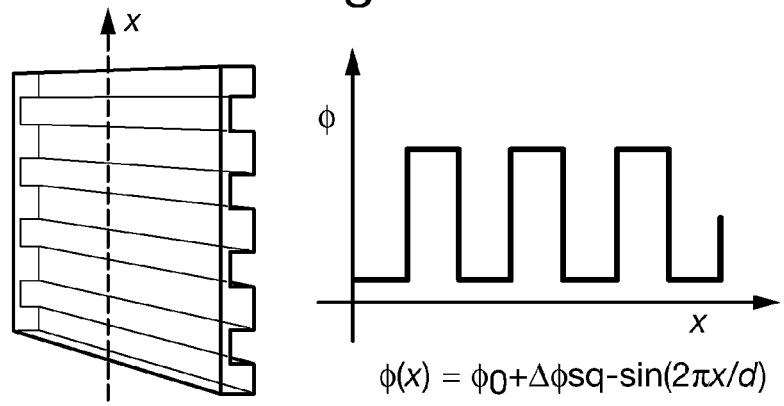
FIG. 5B graphically illustrates the spatially one-dimensional phase profile of the diffraction grating of FIG. 5A.

Here, $\phi$ represents the depth of the spatial shape of the phase profile as shown in FIGS. 5A and FIG. 5B, but expressed as an angle describing the phase of the light amplitude as it passes through the grating. The term 'square sin' means a square wave which has either of two values depending on the argument, i.e. $+\Delta\phi$ or $-\Delta\phi$. It is a square-sinusoidal wave of amplitude $\Delta\phi$ and wavelength d. So the profile $\phi(x)$ periodically varies between $\phi_0 - \Delta\phi$ and $\phi_0 + \Delta\phi$.

The action of coherent mixing of this phase profile when added to an input beam of light is conventionally modelled by an input ray splitting into multiple paths. Each path is a diffracted order, where q refers to a number defining that order. The relative amount of flux entering each order is called diffraction efficiency "DE" which is described by the following equations.

$$DE_{q=0} = \cos^2(\Delta\phi)$$

$$DE_{q=\pm 1} = \left(\frac{2}{\pi}\sin(\Delta\phi)\right)^2 = 40.5\%_{max}$$

$$DE_{q=even} = 0$$

$$DE_{q=odd} = \frac{1}{q^2}DE_{+1}$$

$$\sum_{q \neq 0} DE_m = \sin^2(\Delta\phi) = 100\%_{max}$$

Accordingly, it can be seen that the term DE (diffraction efficiency) refers to the amount of light energy diffracted into each order. By controlling the phase profile amplitude '$\Delta\phi$', the un-diffracted zero-order light can be reduced down to near zero. In addition, the (+/−) first diffraction orders (q=+/−1) can be of the order of 40% efficiency each. And the higher orders may be controlled to be sufficiently low e.g. around 20% in total, so as to be somewhat less consequential.

The simplicity of the grating structure enables the advantage of a controlled zeroth order. The variation of the diffraction efficiency of the zeroth order with wavelength variations is less than in higher orders of diffraction.

The disadvantage of such a simple grating is that it only diffracts, to any substantially or predominant degree, into one order of direction. Because this grating structure is placed on the input face of a fused fibre optic faceplate, in preferred embodiments, then this one predominant diffraction direction is transformed by the action of the fused fibre optic faceplate into an annulus of light at the output of the faceplate.

Hence one obtains the advantages of a simple grating structure with an output optical field that exhibits a two dimensional diffuser pattern.

If the optical system being illuminated is rotationally non-symmetrical, for example if it has a wider horizontal field of view than vertical field of view, then the optical system design may be enhanced if the diffused optical field is also partially rotationally non-symmetrical. This can be achieved by placing a second, i.e. output diffraction grating on the second face of faceplate the where it induces additional diffusion by means of splitting each output ray into more than one diffracted order. This redistributes part of the energy in the output optical field in one direction giving an approximately elliptical optical field. The advantage is higher brightness through more efficient geometrical mapping of the optical field onto an exit pupil.

An additional option is to shape the optical fibres of the optical faceplate into non-cylindrical forms, which can be done by compressing the fibres in the moulding process. This results in complex interactions of the light rays with the internal structure of the fibres.

A specific example is broadly as follows. The input ray angles may be projected onto the input diffraction grating over a rotationally symmetrical +/−5 degree cone that intersects the first face of the faceplate at right angles over the whole surface of the fused fibre optic.

The input diffraction grating may be formed from a photoresist material that has a refractive index of 1.517. The diffraction grating is preferably a square wave profile, as shown in FIGS. 5A and 5B, with a 5 micron period (d). The profile preferably has a linear height/amplitude equivalent to a phase change of 90 degrees ('$\Delta\phi$') at 520 nanometres wavelength of light, and comprises 2.5 micron wide pedestals separated by 2.5 micron wide gaps. At three representative wavelengths (of red, green and blue) the diffraction efficiency values calculated for the diffraction grating are calculated from wave equations as follows (Table 1):

TABLE 1

| Wavelength | +/−1 order transmission efficiency | Zero order transmission efficiency | Zero order reflection efficiency | Total transmitted efficiency (all orders) | Total reflected efficiency (all orders) |
|---|---|---|---|---|---|
| 525 nm | 39% | 0.01% | 3.97% | 96% | 4% |
| 620 nm | 37% | 6% | 0.7% | 96% | 4% |
| 457 nm | 36% | 5.5% | 1.8% | 96% | 4% |

Note that these values are stable with wavelength compared to more sophisticated holograms, and hence exhibit the advantage of simplifying the diffraction grating design. The angle of diffraction of the +/−1 (first) orders would be (Table 2):

TABLE 2

| Wavelength | +/−1 diffracted angle (approx.) degrees |
|---|---|
| 525 nm | 6.02 |
| 620 nm | 7.10 |
| 457 nm | 5.24 |

The difference in these diffraction angles with wavelength may cause a change in the increase in effective Etendue with colour, which can be compensated by rebalancing the light sources.

The effective cone angle of the light entering the fused fibre optic faceplate is now increased in one axis. In green light it is now effectively doubled. The light projected out from the device is now going to cover approximately a +/−11 degree cone angle.

The fused fibre optic device may be a parallel plate of 2 mm thickness and 22 mm diameter, or side (if square). The fibres of the faceplate may have a 4 micron diameter active aperture and may be moulded together to give a 70% geometrical efficiency in projecting light. The same grating profile would preferably be reproduced on both the first and second plate faces of the faceplate.

In another example, the fibre array may be modified so that the input plate face is a different size from the output plate face but with the same number of fibre ends presented at each face. The geometry is achieved by varying the size of the fibres and their spacing, through the depth of the fibre array. Fibre-optical plates with these geometries are readily available. As the size of the fibres is varied, so the output far field light pattern 11 varies by the inverse ratio. By varying the size of the fibres differently in different directions, the output far field light pattern may be made rotationally non-symmetrical. Either of these effects may be employed in embodiments of this invention to adjust/control/arrange the geometry of the far field light pattern 11 as desired.

In another example, fibres of the fibre array in a fibre-optical plate may be twisted, e.g. through 180 degrees so as to change the image orientation. In yet another example, fibres of the fibre array in a fibre-optical plate may be bent with the advantage of fitting the optical path into a specific space envelope. Fibre-optical plates with such arrays are readily available from manufacturers of fibre-optical face plates and the like.

The invention claimed is:

1. An optical diffuser, comprising:
a fibre-optical piece having a first face and a second face;
a plurality of substantially parallel optical fibres each extending along a respective optical axis from an input end of the optical fibre exposed at the first face of the fibre-optical piece to an output end of the optical fibre exposed at the second face of the fibre-optical piece; and
an input optical diffraction grating positioned adjacent to the first face of the fibre-optical piece to extend over at least a part thereof such that light diffracted by the input optical diffraction grating is directed into optical fibres of the plurality of optical fibres in a direction oblique to said optical axes,
wherein at least one of
the input optical diffraction grating diffracts light into the $0^{th}$ (zero$^{th}$) diffraction order with a diffraction efficiency of the $0^{th}$ (zero$^{th}$) diffraction order and diffracts light into the $1^{st}$ (first) diffraction order with a diffraction efficiency of the $1^{st}$ (first) diffraction order, and the diffraction efficiency of the $0^{th}$ (zero$^{th}$) diffraction order is less than the diffraction efficiency of the $1^{st}$ (first) diffraction order in respect of optical wavelengths of light, and
the input optical diffraction grating diffracts light into the $1^{st}$ (first) diffraction order with a diffraction efficiency of the $1^{st}$ (first) diffraction order and diffracts light into the other diffraction orders with a respective diffraction efficiency, and the diffraction efficiency of the $1^{st}$ (first) diffraction order is greater than the respective diffraction efficiency of any other diffraction order in respect of optical wavelengths of light.

2. The optical diffuser according to claim 1 in which the input optical diffraction grating diffracts light into the $0^{th}$ (zero$^{th}$) diffraction order with a diffraction efficiency of less than 10% and diffracts light into the $1^{st}$ (first) diffraction order with a diffraction efficiency of greater than 20% in respect of optical wavelengths of light.

3. The optical diffuser according to claim 1 in which the input optical diffraction grating comprises a varying phase profile defining a variation extending in no more than one dimension.

4. The optical diffuser according to claim 1 in which the input optical diffraction grating comprises a square-wave phase profile.

5. The optical diffuser according to claim 1 comprising an output optical diffraction grating positioned adjacent to the second face of the fibre-optical piece to extend over at least a part thereof such that light output by the optical fibres of the plurality of optical fibres is diffracted in a direction oblique to said optical axes.

6. The optical diffuser according to claim 1 in which said plurality of substantially parallel optical fibres are fixed together side-by-side.

7. The optical diffuser according claim 1 in which said optical axis is substantially perpendicular to one or both said first face of the fibre-optical piece and said second face of the fibre-optical piece.

8. A projection display apparatus comprising:
a light source for generating light to be displayed; and
an optical diffuser according to claim 1 arranged to receive at said first face of the fibre-optical piece said light from said light source and for outputting said light from said second face of the fibre-optical piece, for display by projection,
wherein the optical diffuser further includes an output optical diffraction grating positioned adjacent to the second face of the fibre-optical piece to extend over at least a part thereof such that light output by the optical fibres of the plurality of optical fibres is diffracted in a direction oblique to said optical axes, and wherein:

the light source defines a display optical axis along which said generated light is transmitted to the optical diffuser; and the projection display apparatus further includes projection optical train including one or more optical elements defining a projection optical axis and arranged for receiving said output light from said output optical diffraction grating of the optical diffuser and for projecting the received light for display by projection, wherein the projection optical axis is oblique to the display optical axis.

9. The projection display apparatus according to claim 8, further including a projection screen or mirror onto which said projection optical train is arranged to project said light for display.

10. A helmet-mounted display comprising an optical diffuser according to claim 1.

11. A method of projecting light for display using an optical diffuser, the optical diffuser including a fibre-optical piece, a plurality of substantially parallel optical fibres, and an input optical diffraction grating, the fibre-optical piece having a first face and a second face, the plurality of substantially parallel optical fibres each extending along a respective optical axis from an input end of the optical fibre exposed at the first face of the fibre-optical piece to an output end of the optical fibre exposed at the second face of the fibre-optical piece, and the input optical diffraction grating positioned adjacent to the first face of the fibre-optical piece to extend over at least a part thereof such that light diffracted by the input optical diffraction grating is directed into optical fibres of the plurality of optical fibres in a direction oblique to said optical axes, the method comprising:

generating light to be displayed;
transmitting said light along a display optical axis to the optical diffuser;
receiving said transmitted light at said input optical diffraction grating and therewith diffracting the received light;
receiving said diffracted light at said first face of the fibre-optical piece;
outputting said light from said second face of the fibre-optical piece thereof in a direction towards a projection optical train including one or more optical elements; and,
receiving at the projection optical train said output light from said second surface of the fibre-optical piece; and projecting said light for display,
wherein the optical diffuser further includes an output optical diffraction grating positioned adjacent to the second face of the fibre-optical piece to extend over at least a part thereof such that light output by the optical fibres of the plurality of optical fibres is diffracted in a direction oblique to said optical axes, the method further including receiving said light output from the second face of the fibre-optical piece at said output optical diffraction grating and thereat diffracting said light in a direction oblique to said optical axes and oblique to the display optical axis towards the projection optical train.

12. A helmet-mounted display comprising an optical diffuser according to claim 5.

13. A helmet-mounted display comprising a projection display apparatus according to claim 8.

14. A helmet-mounted display comprising a projection display apparatus according to claim 9.

15. An optical diffuser, comprising:
a fibre-optical piece having a first face and a second face;
a plurality of substantially parallel optical fibres each extending along a respective optical axis from an input end of the optical fibre exposed at the first face of the fibre-optical piece to an output end of the optical fibre exposed at the second face of the fibre-optical piece;
an input optical diffraction grating positioned adjacent to the first face of the fibre-optical piece to extend over at least a part thereof such that light diffracted by the input optical diffraction grating is directed into optical fibres of the plurality of optical fibres in a direction oblique to said optical axes; and
an output optical diffraction grating positioned adjacent to the second face of the fibre-optical piece to extend over at least a part thereof such that light output by the optical fibres of the plurality of optical fibres is diffracted in a direction oblique to said optical axes.

16. The optical diffuser according to claim 15 in which the input optical diffraction grating diffracts light into the 0th (zeroth) diffraction order with a diffraction efficiency of the 0th (zeroth) diffraction order and diffracts light into the 1st (first) diffraction order with a diffraction efficiency of the 1st (first) diffraction order, and the diffraction efficiency of the 0th (zeroth) diffraction order is less than the diffraction efficiency of the 1st (first) diffraction order in respect of optical wavelengths of light.

17. The optical diffuser according to claim 16 in which the input optical diffraction grating diffracts light into the $0^{th}$ (zero$^{th}$) diffraction order with a diffraction efficiency of less than 10% and diffracts light into the $1^{st}$ (first) diffraction order with a diffraction efficiency of greater than 20% in respect of optical wavelengths of light.

18. The optical diffuser according to claim 15 in which the input optical diffraction grating is associated with a plurality of diffraction efficiencies including a diffraction efficiency of the $1^{st}$ (first) diffraction order, and the diffraction efficiency of the $1^{st}$ (first) diffraction order is greater than the diffraction efficiency of any other diffraction order in respect of optical wavelengths of light.

19. The optical diffuser according to claim 15 in which the input optical diffraction grating comprises a varying phase profile defining a variation extending in no more than one dimension.

20. The optical diffuser according to claim 15 in which the input optical diffraction grating comprises a square-wave phase profile.

21. The optical diffuser according to claim 15 in which said plurality of substantially parallel optical fibres are fixed together side-by-side.

22. The optical diffuser according claim 15 in which said optical axis is substantially perpendicular to one or both said first face of the fibre-optical piece and said second face of the fibre-optical piece.

* * * * *